United States Patent Office 3,337,500
Patented Aug. 22, 1967

---

3,337,500
COPOLYETHER ESTERS AND A PROCESS
FOR THEIR PREPARATION
Robert Schnegg and Robert Dippelhofer, Dormagen, Herbert Pelousek, Dormagen-Horrem, Herbert Nordt, Leverkusen, and Heinz-Adolf Dortmann, Bergisch-Gladbach, Germany, assignors to Farbenfabriken Bayer Aktiengesellschaft, Leverkusen, Germany, a corporation of Germany
No Drawing. Filed Dec. 15, 1964, Ser. No. 418,547
Claims priority, application Germany, Dec. 19, 1963,
F 41,583
2 Claims. (Cl. 260—47)

This invention relates to copolyether esters and particularly to fibre-forming linear copolyester ethers having a high viscosity and a melting point above 200° C.

The thermal polycondensation of p-(β-hydroxyethoxy)-benzoic acid methyl esters on their own in the presence of condensation catalysts yields a polyether ester of low melt viscosity and low molecular weight. Such polyether esters cannot be used for the manufacture of shaped articles such as threads, fibres or films because they cannot be spun or cast from the melt or from solution.

Since it is of some interest to use derivatives of p-hydroxybenzoic acid as starting material for the preparation of polyether esters, it has been proposed to prepare mixed polyether esters from p-(β-hydroxyethoxy)-benzoic acid methyl esters and dimethylterephthalate. However, in the known polyether esters, a relatively large quantity of dimethylterephthalate is used for the preparation of the polycondensate in order to produce polyether esters of good quality for spinning and of high melting point and molecular weight.

It is therefore an object of this invention to provide new linear copolyether esters of p-(β-hydroxyethoxy)-benzoic acid (1), 1 to 20 mol percent of a dicarboxylic acid (2) selected from the group consisting of glutaric, pimelic, adipic, sebacic acid and an ether dicarboxylic acid of the formula

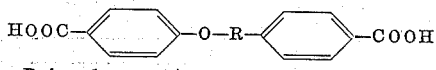

wherein R is selected from the group consisting of radicals of the formulae —CH$_2$—CH$_2$—O—,

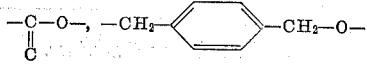

and —(CH$_2$)$_2$—O—(CH$_2$)$_2$—O—, and dihydric aliphatic alcohol (3) having 2–12 carbon atoms, said copolyester ether having a specific viscosity of at least 1.6, measured as a 1.0 percent solution by weight in m-cresol.

It has now been found that copolyether esters can advantageously be prepared from p-(β-hydroxyethoxy)-benzoic acid methyl esters or glycolic esters by condensing these as such or in the form of a low molecular precondensate thereof with glycol and small quantities of esters of dicarboxylic acids in the presence of condensation and/or ester interchange catalysts in the melt. The method of preparing a linear copolyether ester comprises reacting together a mixture of p-(β-hydroxyethoxy)-benzoic acid methylester (1), a dicarboxylic acid lower alkyl ester (2) selected from the group consisting of a glutaric acid alkyl ester, a pimelic acid alkyl ester, an adipic acid alkyl ester, a sebacic acid alkyl ester and an ether dicarboxylic acid alkyl ester of the formula

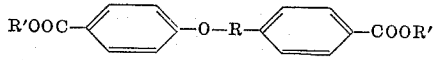

wherein R' is a lower alkyl group and R is selected from the group consisting of radicals of the formulae

—CH$_2$—CH$_2$—O—

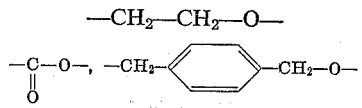

and —(CH$_2$)$_2$—O—(CH$_2$)$_2$—O—, and a dihydric aliphatic alcohol (3) having 2–12 carbon atoms, said reacting is effected in the presence of a catalyst at a temperature of 200 to 320° C. to a specific viscosity η specif. of at least 1.6 measured as a 1.0 percent solution by weight in m-cresol. The copolyether esters prepared by this method have relatively high viscosities and melting points above 200° C. and are thus quite suitable for use in the production of fibres, threads or foils.

The following are examples of suitable esters of ether dicarboxylic acids of the above-mentioned general formulae:

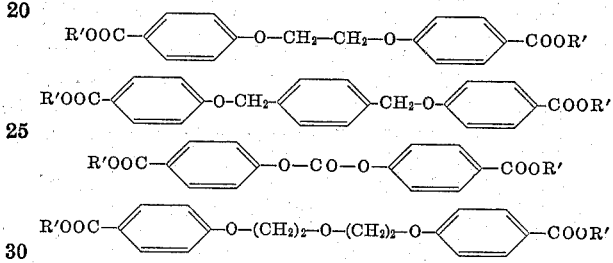

Other esters of dicarboxylic acids which are suitable include the dimethyl-, diglycol- or diethylesters of adipic acid, pimelic acid, sebacic acid or of glutaric acid.

Dihydric aliphatic alcohols having 2 to 12 carbon atoms which are preferably used are ethyleneglycol, trimethylene glycol, diethyleneglycol and cyclohexane dimethanol. The alcohols are desirably employed in such an amount that the hydroxy groups are present in excess over the amount of the carboxyl groups. Preferably the hydroxyl groups are present in an amount of from about 1.2 to about 5 times the amount of carboxylic acid groups, but further excess amounts may be used.

Compared with the polyether esters prepared from p-(β-hydroxyethoxy)-benzoic acid methyl ester by intramolecular condensation, the new copolyether esters have the advantage that they can be drawn into threads and have high molecular weights. Compared with polyesters of aliphatic dicarboxylic acids, they have the basic advantage of higher melting point, which, as is known, has hitherto prevented the practical application of polyesters of aliphatic or aliphatic groups containing dicarboxylic acids.

To prepare the mixed polyether esters, p-(β-hydroxyethoxy)-benzoic acid methyl esters are melted with 1 to 20 mols percent of a dicarboxylic acid ester in the presence of an ester interchange catalyst and an excess of ethylene glycol and heated for several hours at temperatures above 200° C. When the aliphatic alcohol which is split off from the dicarboxylic acid ester has been distilled off, the temperature is raised still further and the melt evacuated. After a further few hours, a polycondensate is obtained which can be spun and which has a relative viscosity of about 1.6 and more. The melting points of the mixed polyether esters obtained are above 200° C.

Condensation or ester interchange catalyst suitable for use in the process of the invention include combinations of lithium acetate with antimony triphenyl or lithium-m-borate as well as combinations of lithium hydride with germanium oxide or potassium titanyl oxalate or zinc acetonate and the combination of antimony triphenyl and zinc acetyl acetonate. Potassium titanyl oxalate may also be used alone as reaction accelerator.

The following examples illustrate the invention for purposes of illustration and not of limitation of the scope of the invention.

Example 1

In a vessel which has an inlet tube for nitrogen, an outlet for the volatile constituents formed during the reaction and a vacuum-tight stirrer, a mixture of 196 g. (1 mol) of p-(β-hydroxyethoxy)-benzoic acid methyl ester, 2 g. of adipic acid diethyl ester, 13.4 g. of ethylene glycol and 0.230 g. of antimony trioxide is melted and is heated for 5 hours at 200 to 250° C. During this time, a light stream of nitrogen is passed either through or over the melt. When the expected quantity of ethanol has been distilled off, the temperature is raised to 270° C. and a vacuum is applied. Towards the end of the reaction, after about 3 hours, the pressure is less than 1 mm. Hg. The polycondensate, which can be spun into threads, has a viscosity of $\eta$ specif.=1.62 (determined on a 1% solution in m-cresol at 25° C.) and begins to melt at 224° C. By the same process there are obtained from 10 g. adipic acid diethyl ester a polycondensate of $\eta$ specif.=1.60 of melting point 205° C.; from
10 g. adipic acid dimethylester a polycondensate of $\eta$ speci.=1.76 of melting point 206° C.; from
10 g. sebacic acid dimethyl ester a polycondensate of $\eta$ specif.=1.58 of melting point 206° C.; and from
10 g. glutaric acid dimethyl ester a polycondensate of $\eta$ specif.=1.62 of melting point 215° C.

Example 2

In a vessel equipped with inlet tube for nitrogen, an outlet for the volatile constituents formed during the reaction and a vacuum-tight stirrer, a mixture of 196 g. (1 mol) of p-(β-hydroxyethoxy)-benzoic acid methyl ester, 10 g. of the dicarboxylic acid ester of the formula

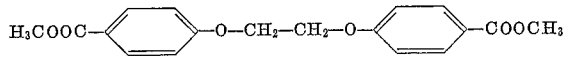

13.4 g. of ethylene glycol and 0.230 g. of antimony trioxide are melted and heated for 4 hours at 200 to 250° C. During this time, a light stream of nitrogen is passed either through or over the melt. When the expected quantity of methanol has been distilled off, the temperature is raised to 270° C. and a vacuum is applied. Towards the end of the reaction, that is after about 3 hours, the pressure is below 1 mm. Hg. The polycondensate, which can be spun into threads, has a viscosity of $\eta$ specif.=1.62 (determined on a 1% solution in m-cresol at 25° C.) and begins to melt at 218° C.

The following polycondensates are obtained by the same method: With 10 g. of a dicarboxylic acid ester of the formula

a polycondensate of $\eta$ specif.=1.62 of melting point 221° C. is obtained.

With 10 g. of a glycol ester of a dicarboxylic acid of the formula

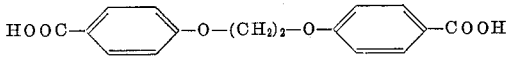

a polycondensate of $\eta$ specif.=1.62 of melting point 200° C. is obtained.

With 20 g. of the glycol ester of the same dicarboxylic acid, a polycondensate of $\eta$ specif.=1.62 of melting point 185° C. is obtained.

What we claim is:

1. A linear copolyether ester of p-(β-hydroxyethoxy)-benzoic acid 1 to 20 mol percent of a dicarboxylic acid selected from the group consisting of

HOOC—⟨⟩—O—CH₂—⟨⟩—CO₂—O—⟨⟩—COOH and

HOOC—⟨⟩—O—(CH₂)₂—O—⟨⟩—COOH and ethylene glycol, wherein said copolyether ester has a specific viscosity of at least 1.6, measured as a 1.0-percent solution by weight in m-cresol.

2. The linear copolyether ester claimed in claim 1, wherein the number of hydroxyl equivalents is about 1.2 to about 5 times the number of carboxylic acid equivalents.

References Cited

UNITED STATES PATENTS

| | | | |
|---|---|---|---|
| 2,471,023 | 5/1949 | Cook et al. | 260—47 |
| 2,503,251 | 4/1950 | Edwards et al. | 260—47 |
| 2,799,665 | 7/1957 | Lincoln | 260—47 |
| 3,033,822 | 5/1962 | Kibler et al. | 260—47 |
| 3,053,810 | 9/1962 | Griehl et al. | 260—47 |

WILLIAM H. SHORT, *Primary Examiner.*

LOUISE P. QUAST, *Examiner.*